United States Patent
Wang et al.

(10) Patent No.: US 10,341,926 B2
(45) Date of Patent: Jul. 2, 2019

(54) HANDOVER IN HIGH SPEED SCENARIO

(71) Applicant: Telefonaktiebolaget LM Ericsson (publ), Stockholm (SE)

(72) Inventors: Xiaohui Wang, Limhamn (SE); Torgny Palenius, Barseback (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/322,444

(22) PCT Filed: May 24, 2016

(86) PCT No.: PCT/EP2016/061680
§ 371 (c)(1),
(2) Date: Dec. 27, 2016

(87) PCT Pub. No.: WO2017/202454
PCT Pub. Date: Nov. 30, 2017

(65) Prior Publication Data
US 2018/0098260 A1   Apr. 5, 2018

(51) Int. Cl.
H04W 36/32 (2009.01)
H04W 36/04 (2009.01)
H04W 36/00 (2009.01)
H04W 36/30 (2009.01)
(Continued)

(52) U.S. Cl.
CPC ....... *H04W 36/32* (2013.01); *H04W 36/0005* (2013.01); *H04W 36/0069* (2018.08); *H04W 36/04* (2013.01); *H04W 36/30* (2013.01); *H04W 36/165* (2013.01); *H04W 84/045* (2013.01); *H04W 88/085* (2013.01)

(58) Field of Classification Search
None
See application file for complete search history.

(56) References Cited

U.S. PATENT DOCUMENTS

| 9,131,421 B2 * | 9/2015 | Latva-Aho | H04W 36/24 |
| 2005/0075074 A1 * | 4/2005 | Benson | H04W 36/0088 |
| | | | 455/67.11 |

(Continued)

FOREIGN PATENT DOCUMENTS

| WO | 2012162353 A1 | 11/2012 |
| WO | 2013164033 A1 | 11/2013 |

(Continued)

OTHER PUBLICATIONS

PCT International Search Report, dated Feb. 23, 2017, in connection with International Application No. PCT/EP2016/061680, all pages.

(Continued)

*Primary Examiner* — Anh Ngoc M Nguyen
(74) *Attorney, Agent, or Firm* — Leffler Intellectual Property Law, PLLC

(57) ABSTRACT

Performance optimization of a mobile communications network is disclosed where groups of wireless communication devices are moving together at high speed, e.g. on-board high speed trains. The performance optimization is provided via a multiple layered access context in terms of a low frequency layer serving as a large coverage cell overlapping with multiple smaller cells with higher performance in a high frequency layer.

17 Claims, 6 Drawing Sheets

(51) Int. Cl.
*H04W 84/04* (2009.01)
*H04W 88/08* (2009.01)
*H04W 36/16* (2009.01)

(56) References Cited

U.S. PATENT DOCUMENTS

| | | | |
|---|---|---|---|
| 2013/0344871 A1 | 12/2013 | Kallin et al. | |
| 2014/0153545 A1 | 6/2014 | Dimou et al. | |
| 2015/0181481 A1 | 6/2015 | Masini et al. | |
| 2015/0319668 A1* | 11/2015 | Guo | H04W 4/029 370/331 |
| 2016/0119831 A1* | 4/2016 | Deng | H04W 36/0055 455/436 |

FOREIGN PATENT DOCUMENTS

| | | |
|---|---|---|
| WO | 2016026109 A1 | 2/2016 |
| WO | 2016055095 A1 | 4/2016 |

OTHER PUBLICATIONS

PCT Written Opinion, dated Feb. 23, 2017, in connection with International Application No. PCT/EP2016/061680, all pages.

3GPP TSG RAN Meeting #65, RP-141278, Edinburgh, Scotland, Sep. 9-12, 2014, Motivation of New SI proposal: LTE enhancement under high speed scenario, Huaiwei, HiSilicon, 6 pages.

3GPP TS 36.300, V13.3.0 (Mar. 2016), 3rd Generation Partnership Project; Technical Specification Group Radio Access Network; Evolved Universal Terrestrial Radio Access (E-UTRA) and Evolved Universal Terrestrial Radio Access getwork (E-UTRAN); Overall description; Stage 2 (Release 13), 295 pages.

3GPP TS 36.331, V13.1.0 (Mar. 2016), 3rd Generation Partnership Project; Technical Specification Group Radio Access Network; Evolved Universal Terrestrial Radio Access (E-UTRA); Radio Resource Control (RRC); Protocol specification (Release 13), 551 pages.

Rintaro Yoneya et al., IEEE 82nd Vehicular Technology Conference, Two Novel Handover Algorithms with Load Balancing for Heterogeneous Network, Sep. 6, 2015, 5 pages.

Meng-Shiuan Pen et al. IEEE Transactions on Vehicular Technology, vol. 64, No. 2, Feb. 2015, An Enhanced Handover Scheme for Mobile Relays in LTE-A High-Speed Rail Networks, pp. 743-756.

3GPP TR 36.836, V11.1.0, (Dec. 2012), 3rd Generation Partnership Project; Technical Specification Group Radio Access Network; Evolved Universal Terrestrial Radio Access (E-UTRA); Mobility Enhancements in Heterogeneous Networks (Release 11), 53 pages.

* cited by examiner

HANDOVER IN HIGH SPEED SCENARIO

TECHNICAL FIELD

Embodiments herein relate to wireless communication and more specifically to control of handover in a scenario where wireless communication devices are moving at high speeds.

BACKGROUND

Wireless communication systems, i.e. systems that provide communication services to wireless communication devices such as mobile phones, smartphones (often denoted by UE that is short for user equipment) as well as machine-type communication (MTC) devices, have evolved during the last decade into systems that must utilize the radio spectrum and other system resources in the most efficient manner possible. A reason for this is the ever increasing demand for high speed data communication capabilities in terms of, e.g., bitrate and to provide these capabilities at any given time, at any geographical location and also in scenarios where the wireless communication device is moving at a high speed, e.g., on board a high speed train (HST). To meet this demand much work is being done within the third generation partnership project (3GPP) for enhancing performance in high speed train environments. The justification is that there are railways such as Japan Tohoku Shinkansen (running at 320 km/h), German ICE (330 km/h), AGV Italo (400 km/h), and Shanghai Maglev (430 km/h) at which vehicles travel at greater speed than 300 km/h and where there is demand for a large number of simultaneous users using mobile services while being on-board such a HST.

Given the fact that mobility is one of the corner stones of the 3GPP system, mobility management is conventionally carried out individually, e.g. base stations such as evolved NodeB's (eNodeB) in a 3GPP long term evolution (LTE) system configure radio frequency (RF) signal measurement events and provide configuration information to wireless communication devices via radio resource control (RRC) signalling. Having received such configuration information, a wireless communication device measures requested parameters such as reference signal received power (RSRP) and/or reference signal received quality (RSRQ) and reports the results back to base stations, e.g. eNodeB, periodically or when specific event criterions are met. A handover decision is made when a target cell is more suitable than a serving cell.

As FIG. 1 illustrates, a handover procedure in 3GPP wireless communication system typically involves a signalling sequence between a wireless communication device (denoted UE), a source eNodeB, a target eNodeB, a mobility management entity (MME) and a serving gateway (SGW). In summary, a conventional handover procedure as shown in FIG. 1 comprises, from the point of view of a source cell (i.e a source eNodeB) obtaining of RF signal measurements from the wireless communication device and, after having analysed the measurements, informing a target eNodeB to take over control of the wireless communication device. Having taken over communication with the wireless communication device via a random access (RA) procedure, the target eNodeB controls a transfer of radio bearers between the wireless communication device and the SGW.

In situations where many wireless communication devices are moving together, e.g. on-board a high speed train carrying a large number of passengers, such conventional mobile management method may become problematic due to generation of a large number of handover requests during very short time periods. Examples of such situations are described in United States patent application publication 2015/0181481 and in "An Enhanced Handover Scheme for Mobile Relays in LTE-A High-Speed Rail Networks", IEEE Transactions on Vehicular Technology V. 64 No. 2, 763 (2015).

Existing solutions, such as those cited above, are focused on mobility management with the aim of reducing the number of handover events of the group of wireless communication devices. This means a preference for larger cells and lower radio frequencies.

A drawback with such a low radio frequency scenario is that, since a group of wireless communication devices will require a relatively high total capacity in terms of, e.g., bitrate and response time, use of larger cells having lower radio frequencies will limit the high capacity requirement. It is therefore desirable to find a way to provide high capacity to groups of wireless communication devices that is not restricted to low radio frequency solutions. In other words, a solution that makes use of higher radio frequencies and therefore enables higher capacity is desirable.

However, since normally cell sizes become smaller at higher radio frequencies, handover events become ever more frequent and the degradation of performance due to handovers becomes severe. Such a drawback may be mitigated by increasing the size of a cell by configuring a few radio base station radio beam sectors to form a "supercell", yet the handover issues still need to be handled between such "supercells".

SUMMARY

In view of the above, an object of the present disclosure is to overcome or at least mitigate at least some of the drawbacks related to handover in a HST scenario.

This is achieved in a first aspect by a method performed by a network node for controlling handover of a wireless communication device from a source cell to a target cell. The network node is maintaining a first radio cell at a first cell carrier frequency and the cell has a radio coverage that covers at least part of both the source cell and the target cell. The source cell is maintained by a source cell node at a source cell carrier frequency and the target cell is maintained by a target cell node at a target cell carrier frequency. The source cell carrier frequency and the target cell carrier frequency are higher than the first cell carrier frequency. The method comprises a number of actions as follows. A first performance value is estimated that is associated with communication between the wireless communication device and the source cell. A second performance value is estimated that is associated with communication between the wireless communication device and the target cell. A determination is made that the wireless communication device is about to move into coverage of the target cell. If the second performance value is greater than the current performance value, then the wireless communication device is assisted to perform a handover from the source cell to the target cell by a transmission of a handover request to the target cell, reception of a handover request acknowledgement from the target cell, and a transmission of instructions to the wireless communication device for connecting to the target cell.

An effect of such a method is that it enables an optimization of the performance of a mobile communications network where groups of wireless communication devices are moving together at high speed, e.g. on-board high speed trains. The method enables the performance optimization in that it provides a multiple layered access context in terms of a low frequency layer serving as a large coverage cell (the first cell in the above summary) overlapping with multiple smaller cells with higher performance (source and target cell in the above summary) in a high frequency layer. Handover events are handled by the coverage cell, directing the wireless communication device moving at high speed to the best performance cell in the high frequency layer.

This procedure may be done at a time based on (as will be exemplified below) speed/time estimates, positioning system or received uplink RF signal characteristics (e.g. RF fingerprint profiles etc.) without the need of performing standard handover procedures in the high frequency layer. In short, wireless communication devices moving at high speed may be directed to the best performance cell at the high frequency layer at a given time and location by the low frequency layer to avoid frequent standard hand-over events and thereby ensuring high performance for the connections that are used by the wireless communication devices in the wireless communications network.

In some embodiments, any of the estimation of a first performance value and the estimation of a second performance value may comprise measuring RF signals received from the wireless communication device.

In some embodiments, any of the estimation of a first performance value and the estimation of a second performance value may comprise receiving at least one measurement report from any of the source cell and the target cell. In these embodiments, the at least one measurement report comprises information associated with RF signals from the wireless communication device received and measured by any of the source cell and the target cell.

Some embodiments comprise a determination of a spatial motion value for the wireless communication device. In these embodiments, the determination that the wireless communication device is about to move into coverage of the target cell is based on the spatial motion value. For example, the determination of the spatial motion value for the wireless communication device may be based, at least partly, on any of the estimated first performance value and the estimated second performance value. The determination of the spatial motion value for the wireless communication device may also be based, at least partly, on a-priori knowledge about spatial locations of any of the source cell and the target cell.

In some embodiments, the network node maintains the first radio cell such that the radio coverage of the first cell covers both the source cell and the target cell. In such embodiments, a connection is maintained between the first cell and the wireless communication device subsequent to the transmission of instructions to the wireless communication device for connecting to the target cell. In other embodiments, the network node maintains the first radio cell such that the radio coverage of the first cell covers only a part of the source cell and only a part of the target cell in an area of overlap of the first cell, the source cell and the target cell. In these embodiments, the method comprises disconnecting, subsequent to the transmission of instructions to the wireless communication device for connecting to the target cell, the wireless communication device from the first cell.

Embodiments include those wherein any of the first performance value and the second performance value is associated with any of a signal strength, a signal to interference ratio, SIR, and an error rate associated with a signal.

In another aspect there is provided a network node for controlling handover of a wireless communication device from a source cell to a target cell. The network node comprises input/output circuitry, a processor and a memory.

The memory contains instructions executable by the processor whereby the network node is operative to maintain a first radio cell at a first cell carrier frequency having a radio coverage that covers at least part of both the source cell and the target cell. The source cell is maintained by a source cell node at a source cell carrier frequency and the target cell is maintained by a target cell node at a target cell carrier frequency. The source cell carrier frequency and the target cell carrier frequency are higher than the first cell carrier frequency. The network node is further operative to:
   estimate a first performance value associated with communication between the wireless communication device and the source cell,
   estimate a second performance value associated with communication between the wireless communication device and the target cell,
   determine that the wireless communication device is about to move into coverage of the target cell, and
   if the second performance value is greater than the first performance value, then assist the wireless communication device to perform a handover from the source cell to the target cell by:
      transmit a handover request to the target cell,
      receive a handover request acknowledgement from the target cell, and
      transmit instructions to the wireless communication device for connecting to the target cell.

The network node as summarized above may be embodied in various embodiments that correspond to the above summarized embodiments of a method.

In another aspect there is provided a computer program, comprising instructions which, when executed on at least one processor in a network node, cause the network node to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

DETAILED DESCRIPTION

Figure 1:
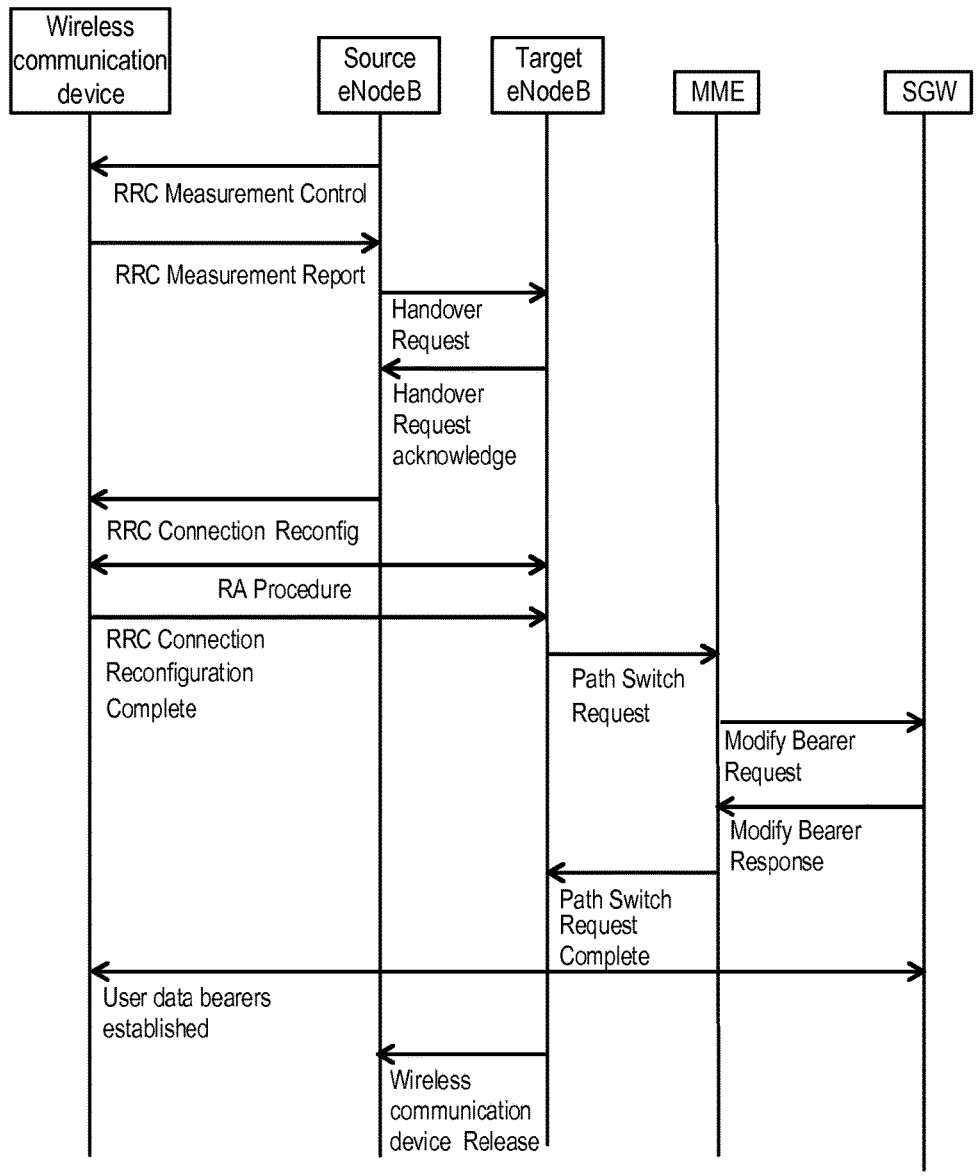
FIG. 1 is a signaling diagram of a prior art handover procedure.

As discussed above, the procedure of handover is the standard way in a wireless communications network to keep wireless communication devices on the move while they are being served more or less seamlessly by the wireless communications network. As FIG. 1 illustrates, handover is a rather complicated procedure and it becomes much more troublesome to perform the necessary signalling actions in high speed scenarios where a plurality of users of wireless communication devices are sitting close to one another moving at high speed. A typical example is of course a high speed train as discussed above. In such a scenario it is easy to realize that a huge amount of handover events have to be handled by the wireless communications network within very short periods of time. Failing such handover handling will inevitably result in a deteriorated performance of the wireless communications network, e.g. in terms of interrupted and lost connections.

In order to simplify the standard handover procedure and thereby mitigate drawbacks of prior art solutions, it is proposed herein to provide, in a wireless communications network, a coverage layer of cells (Lcell) where an Lcell operates at a first relatively low radio frequency. The Lcell covers a plurality of high performance cells (Hcell), which are similar to normal cells or supercells at higher radio frequencies. Such a scenario may be considered as a multiple layered access network, which in some aspects may be seem related to prior art multiple layer networks such as the so-called heterogeneous network (HetNet) defined by 3GPP. However, the present disclosure differs from, e.g., HetNet that typically comprises one or more isolated small cells under the coverage of a large cell that enables mobility and coordination between a small cell and a large cell by use of specific procedures including inter-cell interference control (ICIC) and coordinated multipoint transmission (CoMP).

In contrast, the present disclosure provides embodiments that are operative such that, in addition to basic data and signalling services, an Lcell provides information between a wireless communication device and a target Hcell exchanged during a handover procedure such that handover latency from a source Hcell to the target Hcell is significantly reduced. Since the Lcell is relatively large and operates at a relatively low radio frequency, any handover events between different Lcells occur much less frequently and are easier to handle.

As described in detail below, such a simplified handover procedure between a source Hcell and a target Hcell is access-network-based in that the Lcell, via its own measurements or with the help of measurements obtained from the source and target Hcells, achieves higher handover accuracy. In contrast to prior art handover procedures, measurements by the wireless communication device itself are not necessarily required for deciding that a handover from the source Hcell to the target Hcell is to be performed, yet any reported wireless communication device measurements related to other procedures can be used to justify that the access-network-based handover procedure has really provided proper downlink performance to the wireless communication device.

Figure 2A:
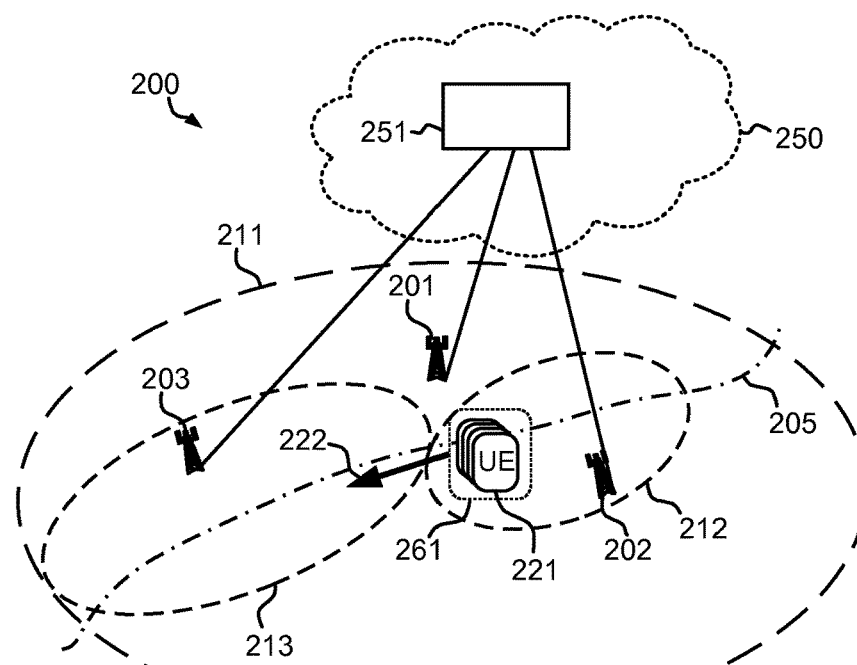
FIGS. 2a and 2b schematically illustrate embodiments of a wireless communications network.
Figure 2B:
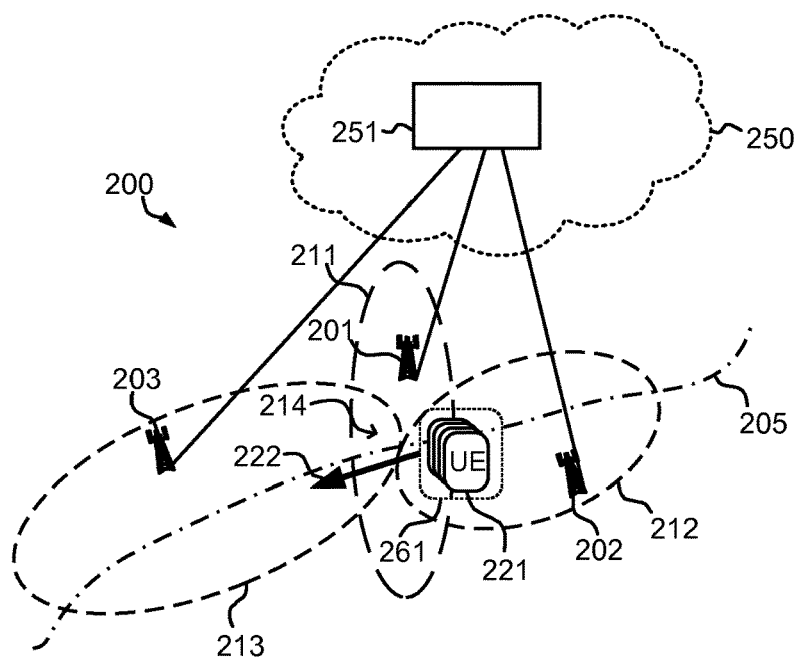

Now with reference to FIGS. 2a-b, FIG. 3 and FIGS. 4a-b, exemplary embodiments of a method will be described in some detail. FIGS. 2a and 2b both illustrate one and the same wireless communications network 200. The method is performed by a network node 201 for controlling handover of a wireless communication device from a source Hcell to a target Hcell. It is to be noted that the source and target HCells will simply be denoted source cell 212 and target cell 213, respectively. The network node 201 is maintaining a first cell 211 at a first cell carrier frequency and the first cell 211 has a radio coverage that covers at least part of both the source cell 212 and the target cell 213. The source cell 212 is maintained by a source cell node 202 at a source cell carrier frequency and the target cell 213 is maintained by a target cell node 203 at a target cell carrier frequency. As discussed above, the source cell carrier frequency and the target cell carrier frequency are higher than the first cell carrier frequency.

As the skilled person will realize, the wireless communications network 200 may comprise a large number of cells in addition to the cells 211, 212, 213. For example, the system 200 may comprise a plurality of Hcells, i.e. source and target cells, similar to the source cell 212 and the target cell 213.

As FIG. 2a exemplifies, the network node 201 that controls the first cell 211 as well as the source cell node 202 and the target cell node 203 may be connected to a central baseband unit 251 so as to facilitate the co-operations between the network node 201 and the source and target cell nodes 202, 203.

Although FIG. 2a (and FIG. 2b) illustrate that the network node 201 and the baseband unit 251 are separate nodes, it is also to be noted that the network node 201 and the baseband unit 251 may be considered as separate or combined individual entities as well as a combination of a plurality of entities or functions. For example, functionality of the network node 201 and the baseband unit 251 may be distributed, in terms of functionality as well as in terms of physical hardware, over one or more processing units that are residing in a logical entity that may be defined as a "cloud" 250.

Figure 4A:
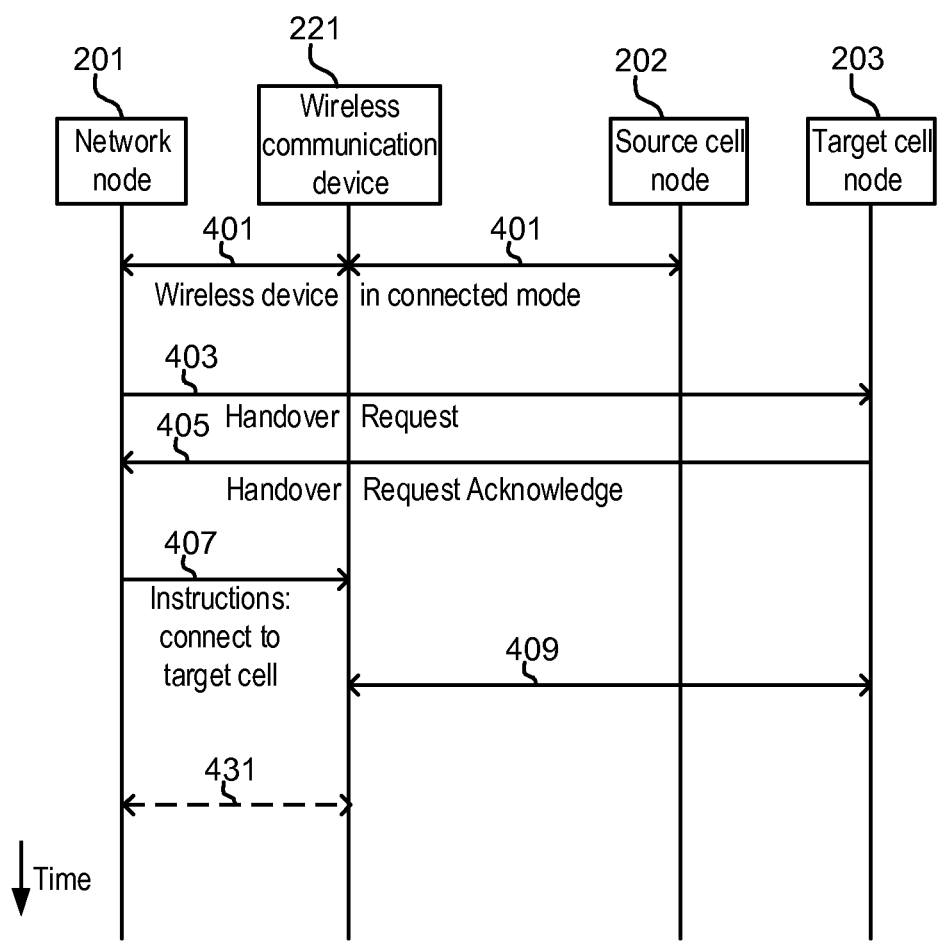
FIGS. 4a and 4b are signaling diagrams illustrating embodiments of methods, FIG. 5 schematically illustrates a network node, and FIG. 6 schematically illustrates a network node.

Furthermore, as illustrated in 2a, a wireless communication device 221 in a group 261 of wireless communication devices 261 are moving along a path 205 at a high speed, as illustrated by a speed or velocity vector 222, under the coverage of the first cell 211 and connected to the network node 201. The wireless communication device 221 as well as the group 261 of wireless communication devices are also under the coverage of the source cell 212 and connected to the source cell node 202. The fact that the wireless communication device 221 is connected to both the first cell 211 and the source cell 212 is schematically illustrated in FIG. 4a by way of signals 401.

As will be described in the following, the network node 201 monitors the position of the wireless communication device 221 in the group 261 relative to the source and target cells 212, 213 (and relative to other, not illustrated, potential target cells in the wireless communications network 200). As a consequence of this monitoring determines whether the wireless communication device 221 is about to move from the source cell 212 into the particular target cell 213. Moreover, if the network node 201 finds that the target cell 213 is a "better" Hcell (in terms of so-called performance values, as will be discussed in detail below) than the source cell 212 in which the wireless communication device 221 is connected, the network node 201 will request the wireless communication device 221 (as well as other wireless communication devices in the group 261) to configure the target cell 213 as the new Hcell and de-configure the old Hcell, i.e. the source cell 212, by means of initiating a handover procedure as will be detailed below. This may be performed by way of a dedicated or common RRC reconfiguration procedure so that the data streams from the wireless communication device 221 (and any other wireless communication device in the group 261) will reach the central baseband unit 251 via the new Hcell, i.e. the target cell 213, and downlink data from the central baseband unit 251 will send to the wireless communication device 221 also via the new Hcell.

Figure 3:
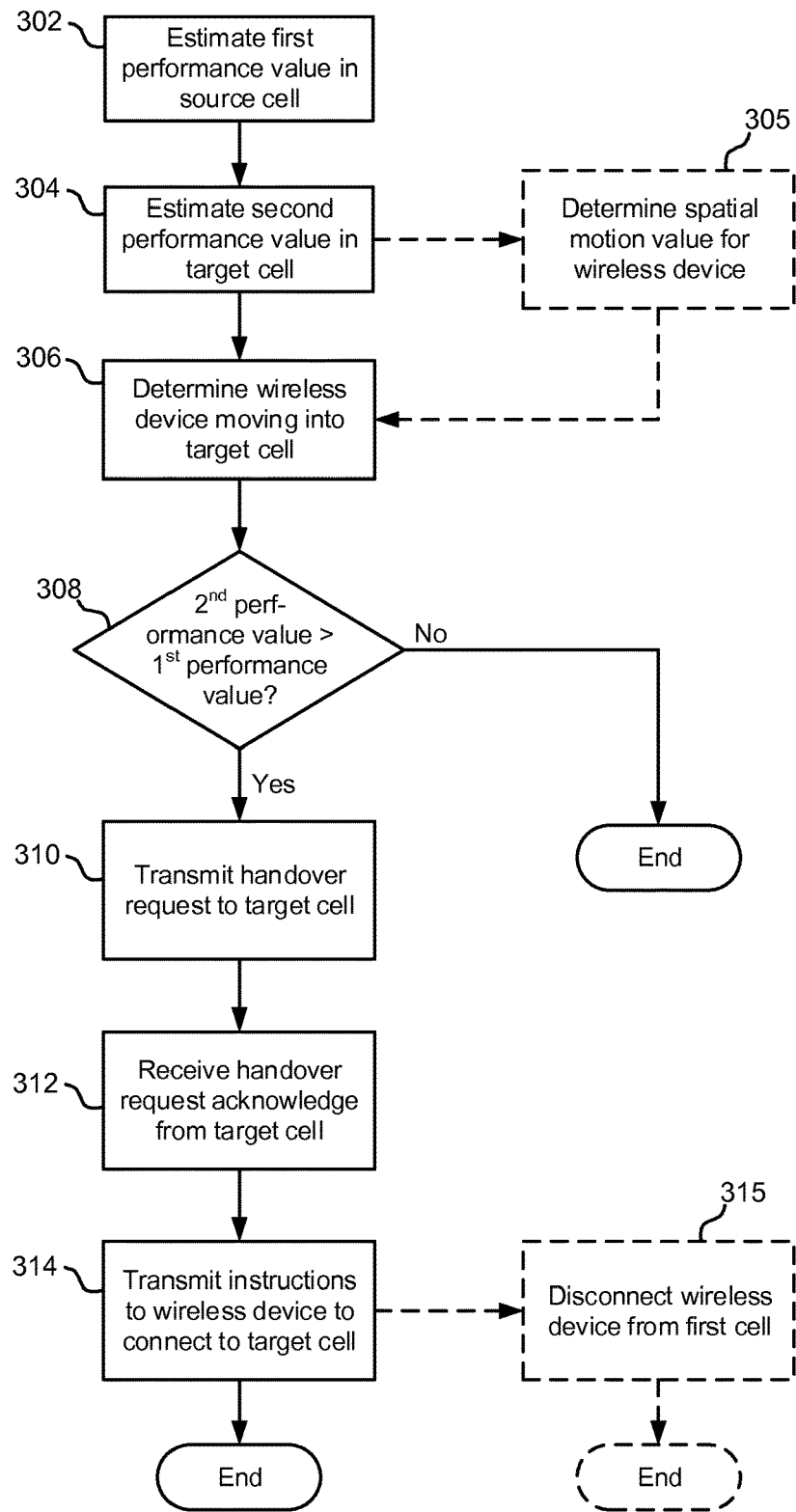
FIG. 3 is a flowchart illustrating embodiments of methods.

Embodiments of a method will now be described with reference to a number of actions that are performed by the network node 201, remembering that reference will be made to the wireless communications network 200 in FIG. 2a and FIG. 2b, the flowchart in FIG. 3 and the signaling diagrams in FIGS. 4a and 4b.

Action 302

An estimation is made of a first performance value associated with communication between the wireless communication device 221 and the source cell 212.

Action 304

An estimation is made of a second performance value associated with communication between the wireless communication device 221 and the target cell 213.

Any of the estimation of a first performance value and the estimation of a second performance value may comprise measuring RF signals received from the wireless communication device 221. Although not illustrated explicitly in the signalling diagram of FIG. 4a, it is to be noted that such RF signals may be any appropriate RF signal received by the network node 201 from the wireless communication device 221, including reference signals and any other signal that can be measured.

Figure 4B:
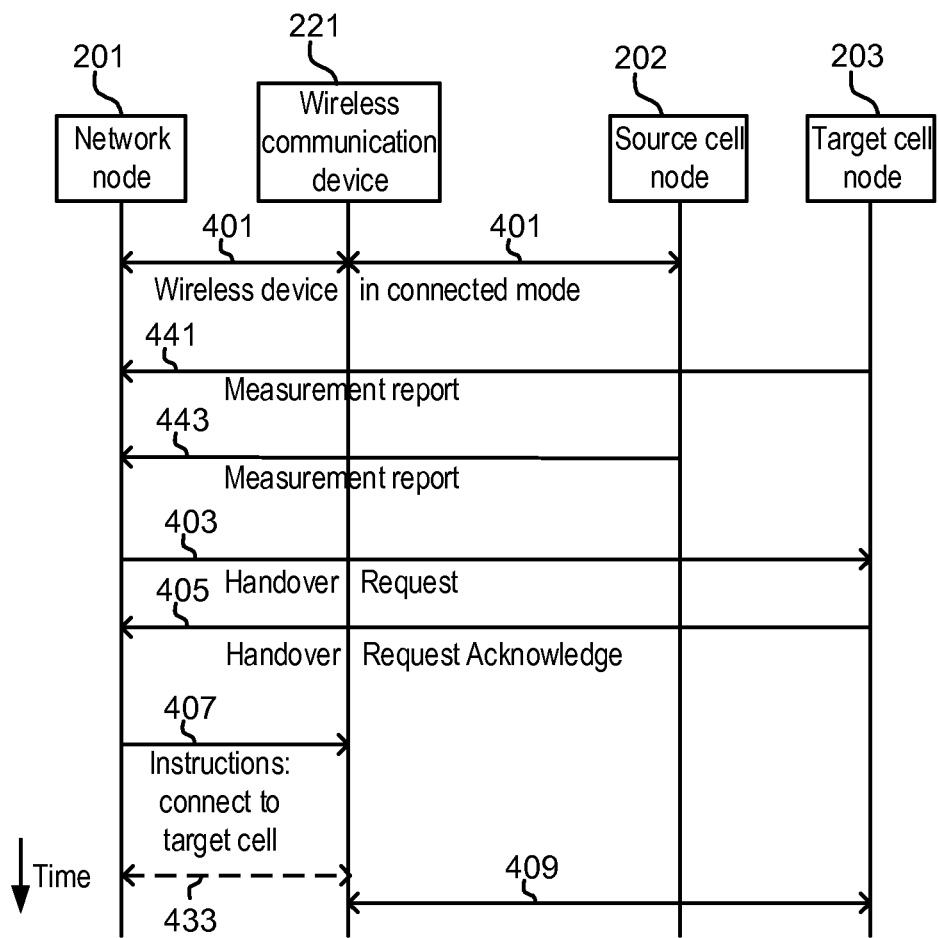

As illustrated in FIG. 4b, embodiments include also those in which any of the estimation of a first performance value and the estimation of a second performance value may comprise (in addition to or instead of measurements performed by the network node 201) receiving at least one measurement report 441, 443 from any of the source cell 212 and the target cell 213. Such at least one measurement report may comprise information associated with RF signals from the wireless communication device 221 received and measured by any of the source cell 212 and the target cell 213.

For example, regarding the first and second performance values, these may be associated with any of a signal strength, a signal to interference ratio, SIR, and an error rate associated with a signal. As briefly discussed above, the use of performance values is to represent a measure of how "good" a connection is between the wireless communication device 221 and a cell.

Action 306

A determination is made that the wireless communication device 221 is about to move into coverage of the target cell 213.

For example, this determination that the wireless communication device is about to move into coverage of the target cell 213 may be based on a spatial motion value (e.g. speed and/or position) that is determined in an action 305. Such a determination of the spatial motion value for the wireless communication device 221 maybe based, at least partly, on any of the estimated first performance value and the estimated second performance value. Also, such a determination of the spatial motion value for the wireless communication device 221 maybe based, at least partly, on a-priori knowledge about spatial locations of any of the source cell 212 and the target cell 213.

In other words, criterions for the network node 201 to determine movement into the target cell 213 may be explicitly position-based, or based on estimated speed of the wireless communication device 221 and the time that it left a reference point, e.g. closest point to the Lcell (i.e. network node 201). In a more advanced manner, the network node 201 may derive the wireless communication device 221 positions by match uplink RF fingerprints that it receives. Moreover, the Hcells (i.e. source and target cell nodes 202, 203) may also assist the network node 201 to select a target cell by matching uplink RF fingerprints received by the source cell node 202 to indicate that the wireless communication device 221 is closer to the target cell node 203. (RF fingerprint is to be understood as received RF signals from multiple wireless communication devices with delay or directional profiles over time.)

Such a fingerprint matching may be realized by configuring a receiver branch in the target cell node 203 to receive the uplink RF signals from the wireless communication device 221, followed by a comparison of measurement results of the wireless communication device 221 from the source cell node 202 and the target cell node 203 in the central baseband unit 251 (remembering that the network node 201 and the baseband unit 251 may be separate or combined nodes). Such a procedure can even yield receiver diversity gains of the uplink data streams if the central baseband unit 251 can combine the data received by source and the target cell nodes 202, 203 even if the target cell 213 is not yet RRC-connected to the wireless communication device 221 explicitly.

Action 308

A check is made whether or not the second performance value is greater than the first performance value. If that is the case, then the wireless communication device is assisted to perform a handover from the source cell to the target cell by actions 310-314.

In other words, this action represents the above discussed check whether a target cell (here the target cell 213) is better than the source cell 212 to which the wireless communication device 221 is currently connected.

Action 310

A transmission is made of a handover request 403 to the target cell 213.

Action 312

A handover request acknowledgement 405 is received from the target cell 213.

Action 314

A transmission is made of instructions 407 to the wireless communication device 221 for connecting to the target cell 213.

As FIG. 2a illustrates, embodiments of a method in the network node 201 may be such that the network node 201 maintains the first radio cell 211 such that the radio coverage of the first cell 211 covers both the source cell 212 and the target cell 213 and wherein a connection is maintained between the first cell 211 and the wireless communication device 221 subsequent to the transmission of instructions to the wireless communication device for connecting to the target cell.

Other embodiments of the method in the network node 201 may entail the network node 201 maintaining the first radio cell 211 such that the radio coverage of the first cell 211 covers only a part of the source cell 212 and only a part of the target cell 213 in an area of overlap 214 of the first cell 211, the source cell 212 and the target cell 213. This is illustrated in FIG. 2b. Such embodiments comprises disconnecting, in an action 315, the wireless communication device 221 from the first cell 212 subsequent to the transmission (in action 314) of instructions to the wireless communication device 221 for connecting to the target cell 213. Such a disconnection may involve signalling 431 between the network node 201 and the wireless communication device 221 as illustrated in FIG. 4a or it may involve signalling 433 as illustrated in FIG. 4b.

These embodiments may be viewed as an alternative to the embodiments (illustrated in FIG. 2a) where a large Lcell (i.e. the first cell 211) covers multiple Hcells (i.e. source and target cells including the source cell 212 and the target cell 213). A characteristic of these embodiments is that the first cell 211 has good coverage only of the overlapping area 214 where the source cell 212 and target cell 213 meet or overlap. Remembering that the first cell 211 operates at a relatively low radio frequency and noting that it operates with reserved resources including random access resources such as random access channel (RACH) preambles, it can efficiently assist the handover process of the wireless communication device 221 between Hcells (i.e., here, from the source cell 212 to the target cell 213). The wireless communication device 221 (and also any other wireless communication device in the group 261) may set up a connection to the first cell 211 prior to the handover event and communicate with the first cell 211 for signalling and real time application data transfer with low bandwidth demand until it is handed-over to the target cell 213. Then the connection with the first cell 211 may be dropped, unless a further handover between the first cell and other Lcells are needed. Such a solution is cost effective and especially valuable for assisting handover between supercells operating at high frequencies where random access can be rather challenging.

Having received the instructions 407, the wireless communication device 221 may connect to the target cell 213 as illustrated by a communication procedure 409. Such a procedure 409 may involve a random access procedure in a scenario where the source and target cells 212, 213 are configured as normal cells with both data and control channels. Alternatively, if the source and target cells 212, 213 are configured as data-only, i.e. similar to a carrier aggregation scenario, the wireless communication device 221 may communicate as illustrated by procedure 409 and acquire data directly from the source and target cells 212, 213 as controlled via control channels in the first cell 211.

Figure 5:
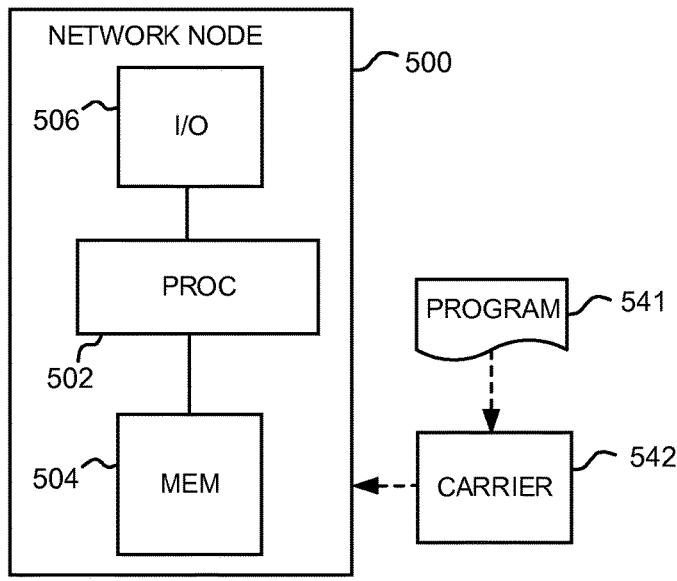

Turning now to FIG. 5, a schematically illustrated network node 500 will be described in some more detail. The network node 500 is for controlling handover of a wireless communication device from a source cell to a target cell. The network node 500 comprises input/output circuitry 506, a processor 502 and a memory 504. The memory 504 contains instructions executable by the processor 502 whereby the network node 500 is operative to maintain a first radio cell at a first cell carrier frequency having a radio coverage that covers at least part of both the source cell and the target cell. The source cell is maintained by a source cell node at a source cell carrier frequency and the target cell is maintained by a target cell node at a target cell carrier frequency. The source cell carrier frequency and the target cell carrier frequency are higher than the first cell carrier frequency. The network node 600 is further operative to:
- estimate a first performance value associated with communication between the wireless communication device and the source cell,
- estimate a second performance value associated with communication between the wireless communication device and the target cell,
- determine that the wireless communication device is about to move into coverage of the target cell, and
- if the second performance value is greater than the first performance value, then assist the wireless communication device to perform a handover from the source cell to the target cell by:
  - transmit a handover request to the target cell,
  - receive a handover request acknowledgement from the target cell, and
  - transmit instructions to the wireless communication device for connecting to the target cell.

The instructions that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

In some embodiments, the network node 500 is operative such that any of the estimation of a first performance value and the estimation of a second performance value comprises measuring radio frequency, RF, signals received from the wireless communication device.

In some embodiments, the network node 500 is operative such that any of the estimation of a first performance value and the estimation of a second performance value comprises receiving at least one measurement report from any of the source cell and the target cell, said at least one measurement report comprising information associated with RF signals from the wireless communication device received and measured by any of the source cell and the target cell.

In some embodiments, the network node 500 is operative to determine a spatial motion value for the wireless communication device, and operative such that the determination that the wireless communication device is about to move into coverage of the target cell is based on the spatial motion value.

In some embodiments, the network node 500 is operative such that the determination of the spatial motion value for the wireless communication device is based, at least partly, on any of the estimated first performance value and the estimated second performance value.

In some embodiments, the network node 500 is operative such that the determination of the spatial motion value for the wireless communication device is based, at least partly, on a-priori knowledge about spatial locations of any of the source cell and the target cell.

In some embodiments, the network node 500 is operative to maintain the first radio cell such that the radio coverage of the first cell covers both the source cell and the target cell and operative such that a connection is maintained between the first cell and the wireless communication device subsequent to the transmission of instructions to the wireless communication device for connecting to the target cell.

In some embodiments, the network node 500 is operative to maintain the first radio cell such that the radio coverage of the first cell covers only a part of the source cell and only a part of the target cell in an area of overlap of the first cell, the source cell and the target cell, and operative to disconnect, subsequent to the transmission of instructions to the wireless communication device for connecting to the target cell, the wireless communication device from the first cell.

In some embodiments, the network node 500 is operative such that any of the first performance value and the second performance value is associated with any of a signal strength, a signal to interference ratio, SIR, and an error rate associated with a signal.

Figure 6:
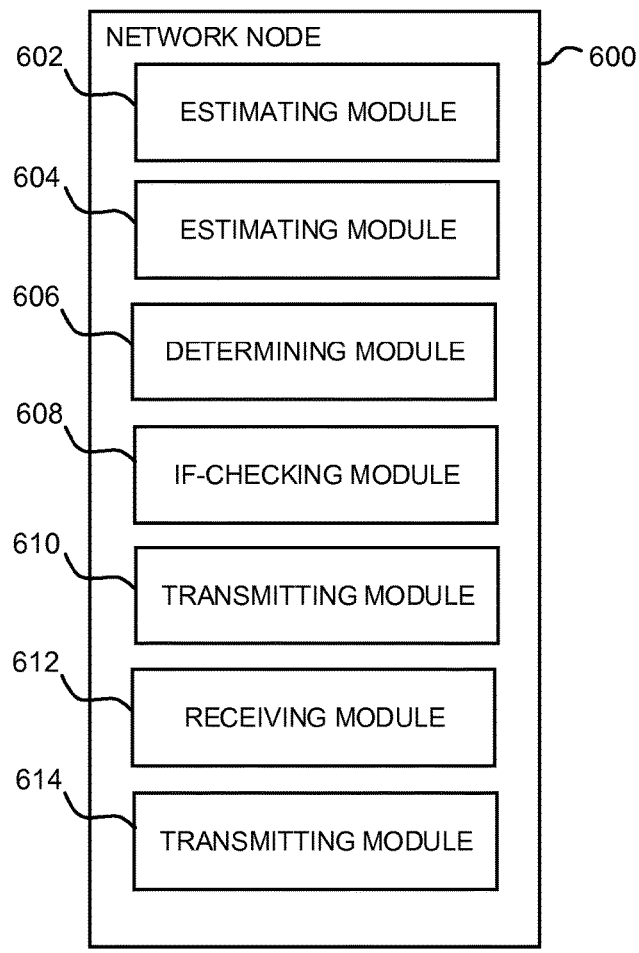

FIG. 6, illustrates schematically a network node 600 that comprises:
- an estimating module 602 configured to estimate a first performance value associated with communication between the wireless communication device and a source cell,
- an estimating module 604 configured to estimate a second performance value associated with communication between the wireless communication device and a target cell,
- a determining module 606 configured to determine that the wireless communication device is about to move into coverage of the target cell, and an if-checking module 608 configured to check if the second performance value is greater than the first performance value, then assist the wireless communication device to perform a handover from the source cell to the target cell by:
- a transmitting module 610 configured to transmit a handover request to the target cell,
- a receiving module 612 configured to receive a handover request acknowledgement from the target cell, and
- a transmitting module 614 configured to transmit instructions to the wireless communication device for connecting to the target cell.

The network node 600 may comprise further modules that are configured to perform in a similar manner as, e.g., the network node 500 described above in connection with FIG. 5.

The invention claimed is:

1. A method performed by a network node, for controlling handover of a wireless communication device from a source cell to a target cell, wherein the network node is maintaining a first cell at a first cell carrier frequency having a radio coverage that covers at least part of both the source cell and the target cell, wherein the source cell is maintained by a source cell node at a source cell carrier frequency, wherein the target cell is maintained by a target cell node at a target cell carrier frequency and wherein the source cell carrier frequency and the target cell carrier frequency are higher than the first cell carrier frequency, the method comprising:
- estimating a first performance value associated with communication between the wireless communication device and the source cell,
- estimating a second performance value associated with communication between the wireless communication device and the target cell,
- determining that the wireless communication device is about to move into coverage of the target cell, and
- if the second performance value is greater than the first performance value, then assisting the wireless communication device to perform a handover from the source cell to the target cell by:
  - transmitting a handover request to the target cell,
  - receiving a handover request acknowledgement from the target cell, and
  - transmitting instructions to the wireless communication device for connecting to the target cell,
- wherein any of the estimation of a first performance value and the estimation of a second performance value comprises the network node receiving at least one measurement report from any of the source cell and the target cell, said at least one measurement report comprising information indicating a signal quality of uplink RF signals from the wireless communication device received and measured by any of the source cell and the target cell.

2. The method of claim 1, wherein any of the estimation of a first performance value and the estimation of a second performance value comprises measuring radio frequency, RF, signals received from the wireless communication device.

3. The method of claim 1, comprising:
- determining a spatial motion value for the wireless communication device, and wherein the determination that the wireless communication device is about to move into coverage of the target cell is based on the spatial motion value.

4. The method of claim 3, wherein the determination of the spatial motion value for the wireless communication device is based, at least partly, on any of the estimated first performance value and the estimated second performance value.

5. The method of claim 3, wherein the determination of the spatial motion value for the wireless communication device is based, at least partly, on a-priori knowledge about spatial locations of any of the source cell and the target cell.

6. The method of claim 1, wherein the network node maintains the first radio cell such that the radio coverage of the first cell covers both the source cell and the target cell and wherein a connection is maintained between the first cell and the wireless communication device subsequent to the transmission of instructions to the wireless communication device for connecting to the target cell.

7. The method of claim 1, wherein the network node maintains the first radio cell such that the radio coverage of the first cell covers only a part of the source cell and only a part of the target cell in an area of overlap of the first cell, the source cell and the target cell, and wherein the method comprises:
- disconnecting, subsequent to the transmission of instructions to the wireless communication device for connecting to the target cell, the wireless communication device from the first cell.

8. The method of claim 1, wherein any of the first performance value and the second performance value is associated with any of:
- a signal strength,
- a signal to interference ratio, SIR, and
- an error rate associated with a signal.

9. A network node, for controlling handover of a wireless communication device from a source cell to a target cell, the network node comprising input/output circuitry, a processor and a memory, said memory containing instructions executable by said processor whereby said network node is operative to maintain a first radio cell at a first cell carrier frequency having a radio coverage that covers at least part of both the source cell and the target cell, wherein the source cell is maintained by a source cell node at a source cell carrier frequency, wherein the target cell is maintained by a target cell node at a target cell carrier frequency and wherein the source cell carrier frequency and the target cell carrier frequency are higher than the first cell carrier frequency, and whereby the network node is further operative to:
- estimate a first performance value associated with communication between the wireless communication device and the source cell,
- estimate a second performance value associated with communication between the wireless communication device and the target cell,
- determine that the wireless communication device is about to move into coverage of the target cell, and
- if the second performance value is greater than the first performance value, then assist the wireless communication device to perform a handover from the source cell to the target cell by:
  - transmit a handover request to the target cell,
  - receive a handover request acknowledgement from the target cell, and
  - transmit instructions to the wireless communication device for connecting to the target cell,
- operative such that any of the estimation of a first performance value and the estimation of a second performance value comprises the network node receiving at least one measurement report from any of the source cell and the target cell, said at least one measurement report comprising information indicating a signal quality of uplink RF signals from the wireless communication device received and measured by any of the source cell and the target cell.

10. The network node of claim 9, operative such that any of the estimation of a first performance value and the estimation of a second performance value comprises measuring radio frequency, RF, signals received from the wireless communication device.

11. The network node of claim 9, operative to:
  determine a spatial motion value for the wireless communication device, and wherein the determination that the wireless communication device is about to move into coverage of the target cell is based on the spatial motion value.

12. The network node of claim 11, operative such that the determination of the spatial motion value for the wireless communication device is based, at least partly, on any of the estimated first performance value and the estimated second performance value.

13. The network node of claim 11, operative such that the determination of the spatial motion value for the wireless communication device is based, at least partly, on a-priori knowledge about spatial locations of any of the source cell and the target cell.

14. The network node of claim 9, operative to maintain the first radio cell such that the radio coverage of the first cell covers both the source cell and the target cell and operative such that a connection is maintained between the first cell and the wireless communication device subsequent to the transmission of instructions to the wireless communication device for connecting to the target cell.

15. The network node of claim 9, operative to maintain the first radio cell such that the radio coverage of the first cell covers only a part of the source cell and only a part of the target cell in an area of overlap of the first cell, the source cell and the target cell, and operative to:
  disconnect, subsequent to the transmission of instructions to the wireless communication device for connecting to the target cell, the wireless communication device from the first cell.

16. The network node of claim 9, operative such that any of the first performance value and the second performance value is associated with any of:
  a signal strength,
  a signal to interference ratio, SIR, and
  an error rate associated with a signal.

17. A nontransitory computer readable storage medium comprising instructions which, when executed on at least one processor in a network node, cause the network node to carry out a method for controlling handover of a wireless communication device from a source cell to a target cell, wherein the network node is maintaining a first cell at a first cell carrier frequency having a radio coverage that covers at least part of both the source cell and the target cell, wherein the source cell is maintained by a source cell node at a source cell carrier frequency, wherein the target cell is maintained by a target cell node at a target cell carrier frequency and wherein the source cell carrier frequency and the target cell carrier frequency are higher than the first cell carrier frequency, the method comprising:
  estimating a first performance value associated with communication between the wireless communication device and the source cell,
  estimating a second performance value associated with communication between the wireless communication device and the target cell,
  determining that the wireless communication device is about to move into coverage of the target cell, and
  if the second performance value is greater than the first performance value, then assisting the wireless communication device to perform a handover from the source cell to the target cell by:
    transmitting a handover request to the target cell,
    receiving a handover request acknowledgement from the target cell, and
    transmitting instructions to the wireless communication device for connecting to the target cell,
  wherein any of the estimation of a first performance value and the estimation of a second performance value comprises the network node receiving at least one measurement report from any of the source cell and the target cell, said at least one measurement report comprising information indicating a signal quality of uplink RF signals from the wireless communication device received and measured by any of the source cell and the target cell.

* * * * *